April 22, 1958

O. CROMWELL ET AL 2,831,437

SQUEEGEE PUMPS

Filed April 2, 1957

INVENTORS
OLIVER CROMWELL &
AGNE VALENTIN OLSSON

BY
Wenderoth, Lind & Ponack
Attys.

United States Patent Office 2,831,437
Patented Apr. 22, 1958

2,831,437

SQUEEGEE PUMPS

Oliver Cromwell and Agne Valentin Olsson,
Malmo, Sweden

Application April 2, 1957, Serial No. 650,131

Claims priority, application Sweden April 4, 1956

1 Claim. (Cl. 103—149)

This invention relates to a squeegee pump for viscous and pasty materials.

As a rule, a squeegee pump comprises an elastic hose which is compressed or flattened against a stationary surface by one or more rollers which are moved along the hose to advance the material therein. The hose is preferably placed against a concavely cylindrical surface of the pump casing, and the rollers compressing or flattening the hose against said concavely cylindrical surface are located on a rotor in the pump casing.

In such squeegee pumps it is easy to produce a pressure on the pressure side of the pump but more difficult to provide a suction on the suction side thereof. It has proved that under certain conditions the elasticity of the hose is not sufficient to cause the hose to open, i. e. resume its normal cylindrical cross section, after the rollers have compressed or flattened it against said stationary surface.

The primary object of the present invention therefore is to provide a squeegee pump in which the hose is forced to resume its normal cylindrical cross section after the rollers have compressed or flattened it against the stationary surface, and to ensure in this manner that a suction is produced on the suction side of the pump.

To realize an improved suction on the suction side, the squeegee pump according to the invention is characterized in that in addition to the rollers compressing or flattening the hose against the concavely cylindrical surface of the pump casing to advance the material in the hose the rotor is provided with a number of rollers arranged in pairs on either side of the hose and exerting a pressure on the flattened hose from two opposed sides, the axes of said rollers lying in planes substantially at right angles to the rotor shaft, and said rollers contributing to the hose resuming its original, substantially cylindrical cross section after said first mentioned rollers have compressed or flattened the hose against said stationary surface.

Further objects of the invention and the advantages gained thereby will become apparent from the following description, reference being had to the accompanying drawing, in which.

Figure 1:
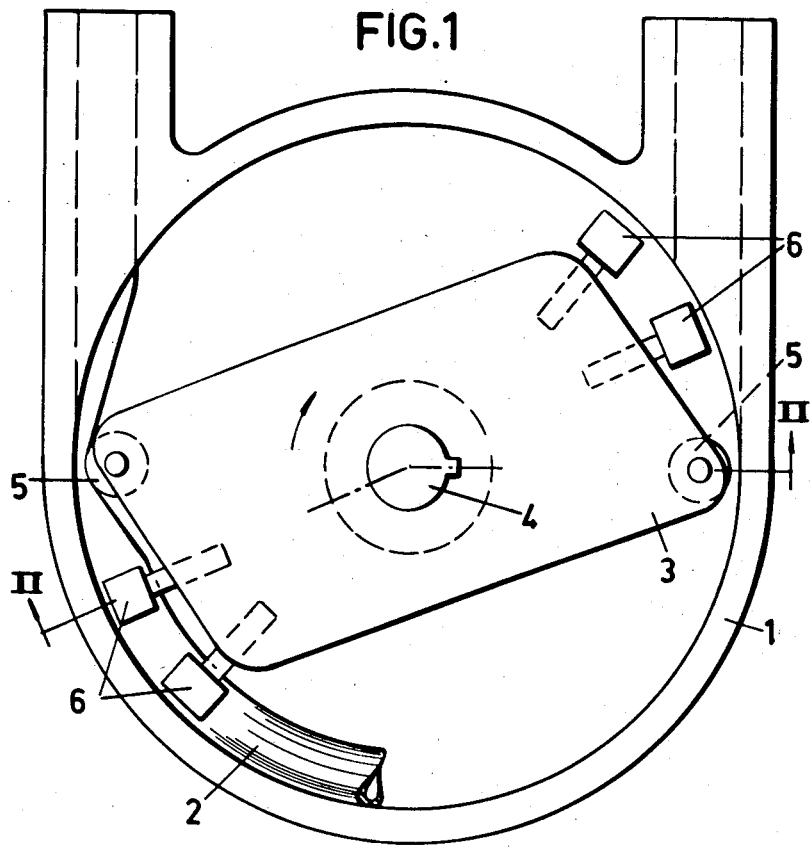
Fig. 1 is a view of the squeegee pump as seen in the direction of the pump axis.
Figure 2:
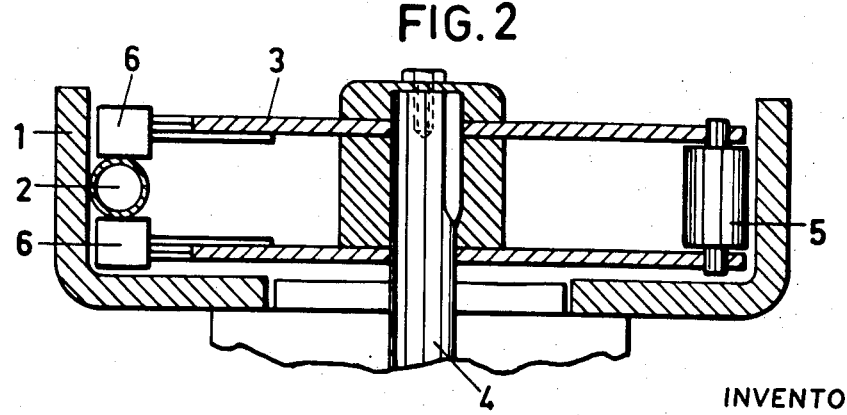
Fig. 2 is a section on line II—II in Fig. 1.

In the drawing, 1 is the pump casing and 2 the hose which is but partly shown. A rotor 3 is mounted on the rotor shaft 4 by means of a hub. The rotor has one or more rollers 5 the axes of which are parallel to the rotor shaft and which compress or flatten the hose 2 against the concavely cylindrical interior surface of the pump casing 1. In addition, the rotor 3 is provided with a number of rollers 6 which are mounted in pairs and the axes of which lie in planes at right angles to the rotor shaft 4.

The rotor 3 is driven by a motor which is but diagrammatically indicated in the drawing. At the rotation of the rotor the rollers 5 are moved in a circular path and thereby compress or flatten the hose against the interior surface of the pump casing, thus advancing the material in said hose from the suction side of the pump to the pressure side thereof. The rollers 6 which are mounted in pairs on either side of the hose 2 follow after the rollers 5 at the rotation of the rotor and exert a pressure on the hose in a direction at right angles to that in which the rollers 5 compressed or flattened the hose 2. The rollers 6 force the hose 2 to open, i. e. resume its normal cylindrical cross section, shortly after the rollers 5 have compressed or flattened the hose against said stationary surface. By forcing the hose to resume its normal shape in this manner, the provision of a sucking effect on the suction side of the pump is ensured.

According to the invention, the rollers 6 opening the hose are arranged in pairs, and the number of pairs can be equal to or a multiple of the number of the rollers 5 for advancing the material in the hose.

What we claim and desire to secure by Letters Patent is:

In a squeegee pump having a cylindrical pump casing, a motor-driven rotor in said casing, rollers on said rotor the axes of which are parallel to the rotor shaft, and an elastic hose placed against the concavely cylindrical interior surface of the pump casing, said rollers being moved along the hose at the rotation of said rotor to compress the hose and advance the material therein, pairs of further rollers on the rotor arranged on either side of said hose and exerting at the rotation of said rotor a pressure on the compressed hose, the axes of said last mentioned rollers lying in planes substantially at right angles to the rotor shaft and said last mentioned rollers contributing to the hose resuming its original, substantially cylindrical cross section, after said first mentioned rollers have compressed the hose against the interior surface of the pump casing.

No references cited.